(12) United States Patent
Fan Jiang et al.

(10) Patent No.: US 7,683,992 B2
(45) Date of Patent: Mar. 23, 2010

(54) MULTI-DOMAIN LIQUID CRYSTAL DISPLAY

(75) Inventors: Shih-Chyuan Fan Jiang, Hsinchu (TW); Ching-Huan Lin, Hsinchu (TW); Chao-Cheng Lin, Hsinchu (TW); Chih-Ming Chang, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 103 days.

(21) Appl. No.: 11/960,730

(22) Filed: Dec. 20, 2007

(65) Prior Publication Data
US 2009/0033813 A1  Feb. 5, 2009

(30) Foreign Application Priority Data
Aug. 2, 2007  (TW) ............................... 96128413 A

(51) Int. Cl.
*G02F 1/1333* (2006.01)
*G02F 1/1337* (2006.01)

(52) U.S. Cl. .................. 349/138; 349/122; 349/129

(58) Field of Classification Search ............ 349/59, 349/122, 129, 138
See application file for complete search history.

(56) References Cited

U.S. PATENT DOCUMENTS

| | | | |
|---|---|---|---|
| 6,001,604 A | 12/1999 | Hartman et al. | |
| 6,936,845 B2 | 8/2005 | Kim et al. | |
| 7,057,695 B2 | 6/2006 | Mun et al. | |
| 7,339,644 B2 * | 3/2008 | Arai et al. | 349/141 |
| 7,423,716 B2 * | 9/2008 | Konno et al. | 349/141 |
| 2003/0227429 A1 | 12/2003 | Shimoshikiryo | |
| 2004/0001167 A1 | 1/2004 | Takeuchi et al. | |
| 2004/0119924 A1 | 6/2004 | Takeda et al. | |
| 2006/0097971 A1 | 5/2006 | Lee et al. | |
| 2006/0103800 A1 | 5/2006 | Li et al. | |

FOREIGN PATENT DOCUMENTS

TW   594353   6/2004

* cited by examiner

*Primary Examiner*—Charlie Peng
(74) *Attorney, Agent, or Firm*—Jianq Chyun IP Office

(57) ABSTRACT

A multi-domain liquid crystal display (LCD) including an active device array substrate, an opposite substrate, an electric field shielding layer, and a liquid crystal layer is provided. The active device array substrate has a plurality of pixels, wherein each pixel has a pixel electrode. The opposite substrate has a common electrode disposed between the opposite substrate and the active device array substrate. The electric field shielding layer is disposed on a part of each pixel electrode. The liquid crystal layer is disposed between the active device array substrate and the opposite substrate. The liquid crystal layer corresponding to each pixel is divided into a low-voltage domain and a high-voltage domain having the same cell gap, wherein the position of the electric field shielding layer is corresponding to the position of the low-voltage domain. Color shift of the multi-domain LCD is improved effectively at oblique viewing angles.

19 Claims, 19 Drawing Sheets

MULTI-DOMAIN LIQUID CRYSTAL DISPLAY

CROSS-REFERENCE TO RELATED APPLICATION

This application claims the priority benefit of Taiwan application serial no. 96128413, filed on Aug. 2, 2007. The entirety of the above-mentioned patent application is hereby incorporated by reference herein and made a part of this specification.

BACKGROUND OF THE INVENTION

1. Field of the Invention

The present invention generally relates to a display, and in particular, to a multi-domain vertical alignment liquid crystal display (MVA-LCD).

2. Description of Related Art

Currently, thin film transistor-liquid crystal displays (TFT-LCDs) with high contrast ratio, no gray scale inversion, high brightness, high color saturation, quick response, and wide viewing angle, etc are required by the market. The common wide viewing angle techniques includes TN displays with wide viewing film, in-plane switching (IPS) LCD, fringe field switching (FFS) LCD, and multi-domain vertical alignment (MVA) LCD. For example, the MVA LCD panel uses some alignment patterns, such as alignment protrusions or the slits to make liquid crystal molecules in each pixel being arranged in multi-direction, thereby obtaining multiple different aligned domains. The conventional MVA LCD panels, due to the alignment protrusions or slits formed on the color filter substrate or the TFT array substrate can make the liquid crystal molecules being arranged in multi-direction, thereby obtaining multiple different aligned domains, thus meeting the requirement for wide viewing angle.

FIG. 1 illustrates the relationship between the normalized transmittance and the gray level of a conventional MVA-LCD with a circular polarizer. A conventional MVA-LCD usually has a circular polarizer because the circular polarizer has higher transmittance and accordingly the brightness of the LCD panel can be increased. The relationship between the normalized transmittance and the gray level of the conventional MVA-LCD having the circular polarizer is referred as a gamma curve. Referring to FIG. 1, the abscissa indicates gray level and the ordinate indicates normalized transmittance. As shown in FIG. 1, even though the conventional MVA-LCD can achieve a wide viewing angle, the gamma curve has different curvatures along with the changes of the viewing angle. In other words, when the viewing angle changes, the brightness displayed by the conventional MVA-LCD also changes, so that the problem of color shift or color washout may generate.

Various conventional techniques have been provided for resolving the problem of color shift or color washout. One of the methods is to form an additional capacitor in each single pixel unit, such that different electric fields can be produced through capacitance coupling between different pixel electrodes in each single pixel unit, respectively, and therefore the liquid crystal molecules above the different pixel electrodes can have different orientations. However, in this method, the display quality of the LCD may be deteriorated due to the RC delay effect even though color shift is reduced.

Another method is to dispose an additional transistor in each pixel unit. In other words, each single pixel unit has two transistors. With these two transistors, two pixel electrodes in the single pixel unit produce two different electric fields so that the liquid crystal molecules above the pixel electrodes have different orientations and accordingly color shift is reduced. However, in this method, a single pixel unit has two transistors and the number of scan lines or data lines for controlling the transistors increases accordingly, and therefore both the complexity and the fabricating cost of the driving circuit are increased.

However, when the foregoing conventional techniques are applied to a conventional LCD, even though the problem of color shift can be resolved, the brightness of the conventional LCD is reduced due to the reduction in the aperture ratio thereof.

SUMMARY OF THE INVENTION

Accordingly, the present invention is directed to a multi-domain vertical alignment liquid crystal display (MVA-LCD), wherein color shift of the MVA-LCD is improved without reducing the brightness of the MVA-LCD.

The present invention provides a multi-domain LCD including an active device array substrate, an opposite substrate, an electric field shielding layer, and a liquid crystal layer. The active device array substrate has a plurality of pixels, wherein each pixel has a pixel electrode. The opposite substrate has a common electrode disposed between the opposite substrate and the active device array substrate. The liquid crystal layer is disposed between the active device array substrate and the opposite substrate. The electric field shielding layer is adjacent to the liquid crystal layer, wherein the position of the electric field shielding layer is corresponding to the position of a low-voltage domain of the liquid crystal layer.

According to an embodiment of the present invention, the liquid crystal layer corresponding to each pixel is divided into a low-voltage domain and a high-voltage domain having the same cell gap.

According to an embodiment of the present invention, the electric field shielding layer is disposed on a part of each pixel electrode, wherein each pixel electrode has a concave region and the electric field shielding layer is located in the concave region. In addition, in the liquid crystal layer corresponding to each pixel, the high-voltage domain is located at both sides of the low-voltage domain, for example.

According to an embodiment of the present invention, the electric field shielding layer is disposed on a part of the common electrode. In an embodiment of the present invention, the high-voltage domain is located at both sides of the low-voltage domain. In another embodiment of the present invention, the common electrode has a concave region and the electric field shielding layer is located in the concave region.

According to an embodiment of the present invention, each pixel electrode is a transmissive electrode. In another embodiment of the present invention, each pixel electrode further includes a reflective electrode connected to the transmissive electrode.

According to an embodiment of the present invention, the active device array substrate further includes a plurality of signal lines electrically connected to corresponding pixels.

According to an embodiment of the present invention, the multi-domain LCD further includes a plurality of alignment protrusions disposed on the common electrode of the opposite substrate. In another embodiment of the present invention, each of the pixel electrodes of the active device array substrate has a plurality of slits.

According to an embodiment of the present invention, in the liquid crystal layer corresponding to each pixel, the low-voltage domain is located around the high-voltage domain. In another embodiment of the present invention, the low-voltage domain and the high-voltage domain are aligned with each other in the direction of columns. In yet another embodiment of the present invention, the high-voltage domain is located at both sides of the low-voltage domain.

According to an embodiment of the present invention, the thickness of the electric field shielding layer is greater than or equal to 1.0 μm.

According to an embodiment of the present invention, the material of the electric field shielding layer is a dielectric material. In another embodiment of the present invention, the material of the electric field shielding layer is an organic material.

As described above, in the present invention, the liquid crystal layer in a multi-domain LCD is divided into low-voltage domains and a high-voltage domains having the same cell gap by an electric field shielding layer, so that the liquid crystal layer in different domains tilts to different directions and accordingly color shift of the multi-domain LCD is improved. Moreover, in the present invention, the thickness of the electric field shielding layer can be adjusted appropriately according to the actual requirement so as to optimize the performance of the multi-domain LCD in color shift reduction. Furthermore, in the present invention, color shift of the multi-domain LCD is improved without changing the design of capacitor or transistor in each pixel unit, therefore compared to the conventional techniques, a higher aperture ratio of the multi-domain LCD is maintained.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
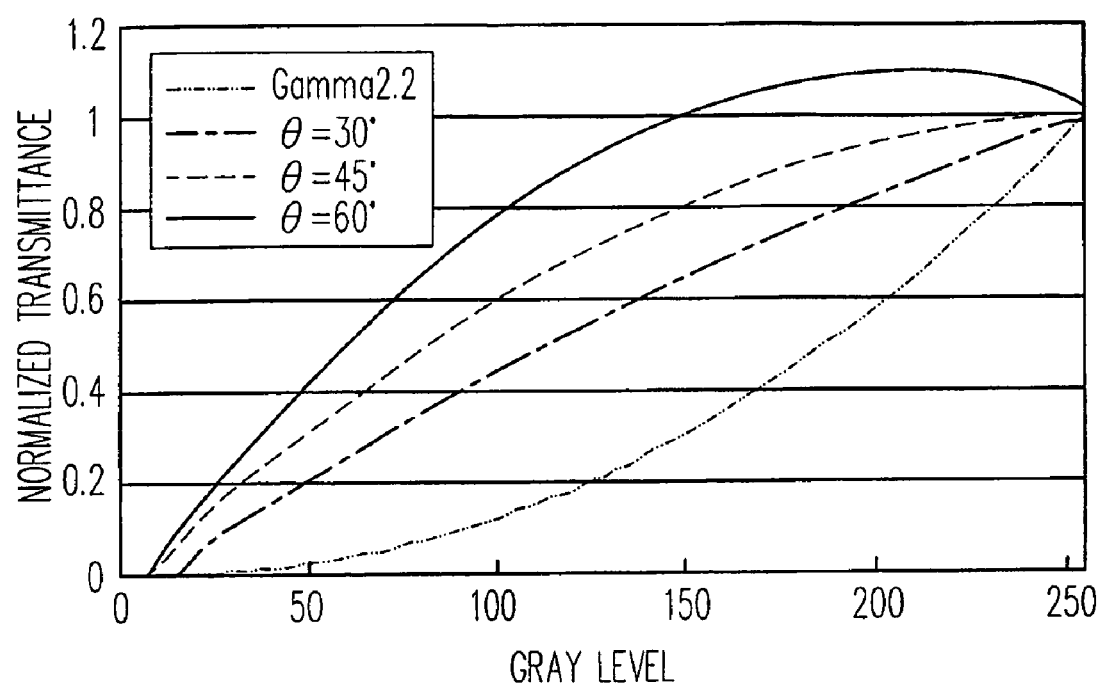
FIG. 1 illustrates the relationship between the normalized transmittance and the gray level of a conventional multi-domain vertical alignment liquid crystal display (MVA-LCD) with a circular polarizer.

Reference will now be made in detail to the present preferred embodiments of the invention, examples of which are illustrated in the accompanying drawings. Wherever possible, the same reference numbers are used in the drawings and the description to refer to the same or like parts.

First Embodiment

Figure 2:
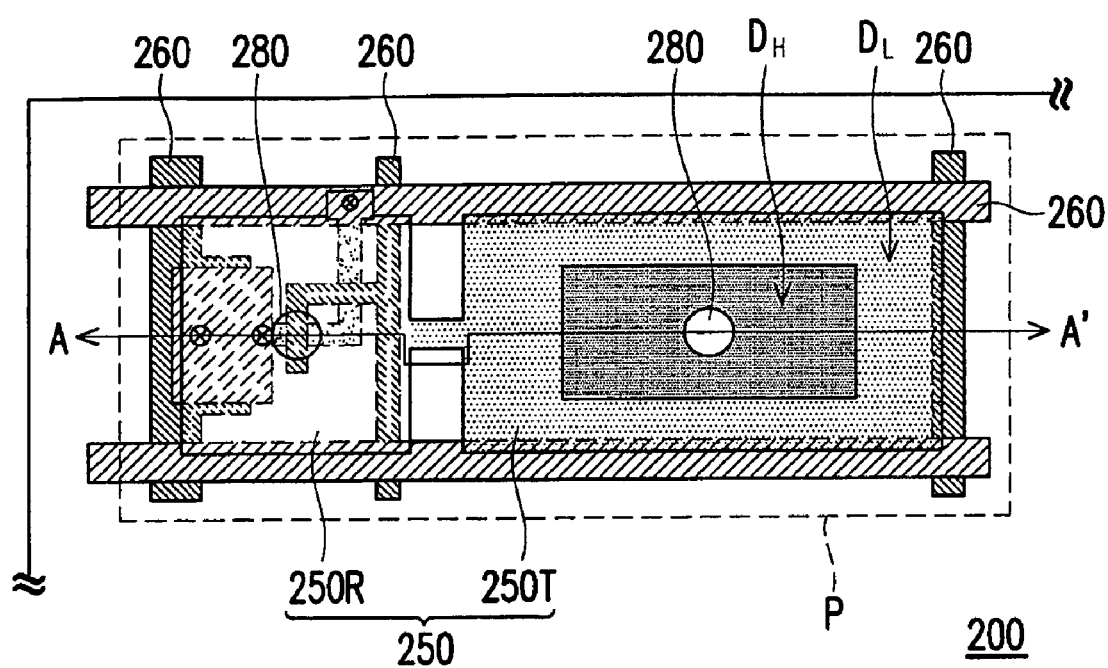
FIG. 2 is a top view of a transflective multi-domain LCD according to a first embodiment of the present invention.
Figure 2A:
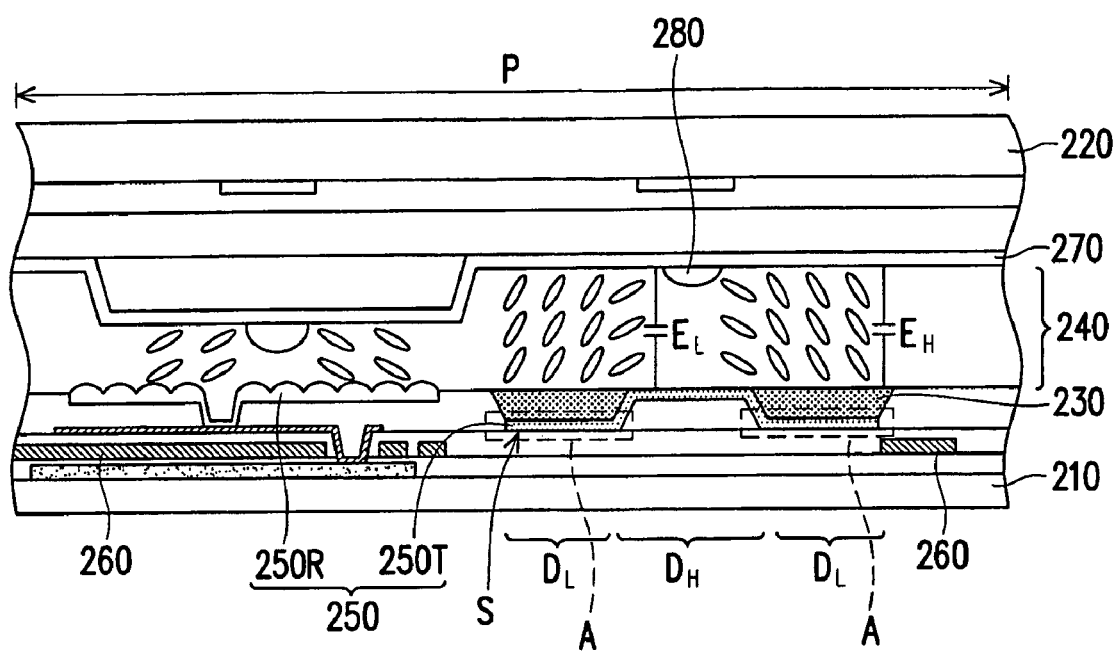
FIG. 2A is a cross-sectional view of the transflective multi-domain LCD in FIG. 2, taken along line A-A'.

FIG. 2 is a top view of a multi-domain liquid crystal display (LCD) according to the first embodiment of the present invention, and FIG. 2A is a cross-sectional view of the multi-domain LCD in FIG. 2, taken along line A-A'. Referring to both FIG. 2 and FIG. 2A, the multi-domain LCD 200 includes an active device array substrate 210, an opposite substrate 220, an electric field shielding layer 230, and a liquid crystal layer 240. The active device array substrate 210 has a plurality of pixels P (only one pixel P is illustrated in FIG. 2 as example), wherein each pixel P has a pixel electrode 250. In the present embodiment, a transflective LCD is described as example. Accordingly, each pixel electrode 250 includes a transmissive electrode 250T and a reflective electrode 250R connected to the transmissive electrode 250T. While in another embodiment of the present invention, each pixel in the multi-domain LCD 200 may be formed by only the transmissive electrode 250T or the reflective electrode 250R. In addition, in the present embodiment, the active device array substrate 210 further includes a plurality of signal lines 260 electrically connected to the corresponding pixels, wherein display signals are input to the pixels through the corresponding signal lines 260.

Referring to FIG. 2A, the opposite substrate 220 has a common electrode 270 disposed between the opposite substrate 220 and the active device array substrate 210. The electric field shielding layer 230 is disposed on a part of each transmissive electrode 250T. The liquid crystal layer 240 is disposed between the active device array substrate 210 and the opposite substrate 220. In the present embodiment, the multi-domain LCD 200 may further include a plurality of alignment protrusions 280 disposed on the common electrode 270 of the opposite substrate 220. In other words, the multi-domain LCD 200 in the present embodiment is a multi-domain vertical alignment liquid crystal display (MVA-LCD).

A concave region S is formed before the transmissive electrode 250T is formed on the active device array substrate 210. After forming the transmissive electrodes 250T, a pixel electrode 250 having a concave region A is formed in the concave region S of each pixel P. After that, the electric field shielding layer 230 is filled into the concave region A of each pixel P so as to fill up the concave region A of the pixel P. In other words, the top surfaces of the pixel electrodes 250 that is not covered by the electric field shielding layer 230 and the top surface of the electric field shielding layer 230 are aligned with the concave region A, so that the liquid crystal layer above the transmissive electrodes 250T has the same cell gap. In addition, since the electric field shielding layer 230 shields part of the electric field between the transmissive electrodes 250T and the common electrode 270, the liquid crystal layer 240 corresponding to each pixel P is divided into a low-voltage domain $D_L$ and a high-voltage domain $D_H$ having the same cell gap, wherein the position of the electric field shielding layer 230 is corresponding to the position of the low-voltage domain $D_L$ of the liquid crystal layer 240, as shown in FIG. 2A. When the electric field shielding layer 230 is disposed on a part of each transmissive electrode 250T, the low-voltage domain $D_L$ is disposed around the high-voltage domain $D_H$ and the orientation of liquid crystal molecules has high stability.

As shown in FIG. 2A, the liquid crystal layer 240 in the multi-domain LCD 200 tilts to different directions along with different intensities of the electric field between the transmissive electrodes 250T and the common electrode 270. Specifically, the intensity of electric field to the liquid crystal layer 240 in the high-voltage domain $D_H$ is $E_H$, and the intensity of electric field to the liquid crystal layer 240 in the low-voltage domain $D_L$ is $E_L$, wherein $E_L$ is lower than $E_H$ due to the shielding of the electric field shielding layer 230. Thereby, the liquid crystal layer 240 corresponding to each pixel P can be divided into a low-voltage domain $D_L$ corresponding to the electric field shielding layer 230 and a high-voltage domain $D_H$ so that the liquid crystal layer 240 corresponding to each pixel P can tilt to different directions in the low-voltage domain $D_L$ and the high-voltage domain $D_H$, and accordingly color shift of the multi-domain LCD is improved.

To optimize the display quality of the multi-domain LCD 200, appropriate thickness and material of the electric field shielding layer 230 can be selected according to the design requirement. Accordingly, the performance of the electric field shielding layer 230 in electric field shielding can be adjusted and the orientation of the liquid crystal layer 240 corresponding to the high-voltage domain $D_H$ and the low-voltage domain $D_L$ can be further adjusted. In the present embodiment, the material of the electric field shielding layer 230 may be a dielectric material, an organic material, or other materials. Specifically, the thicker the electric field shielding layer 230 is or the higher the dielectric constant of the material of the electric field shielding layer 230 is, the more different the high-voltage domain $D_H$ and the low-voltage domain $D_L$ are; otherwise, the less different the high-voltage domain $D_H$ and the low-voltage domain $D_L$ are. The thickness and material of the electric field shielding layer 230 can be appropriately selected according to the actual requirement to improve the display quality of the multi-domain LCD 200.

Figure 2B:
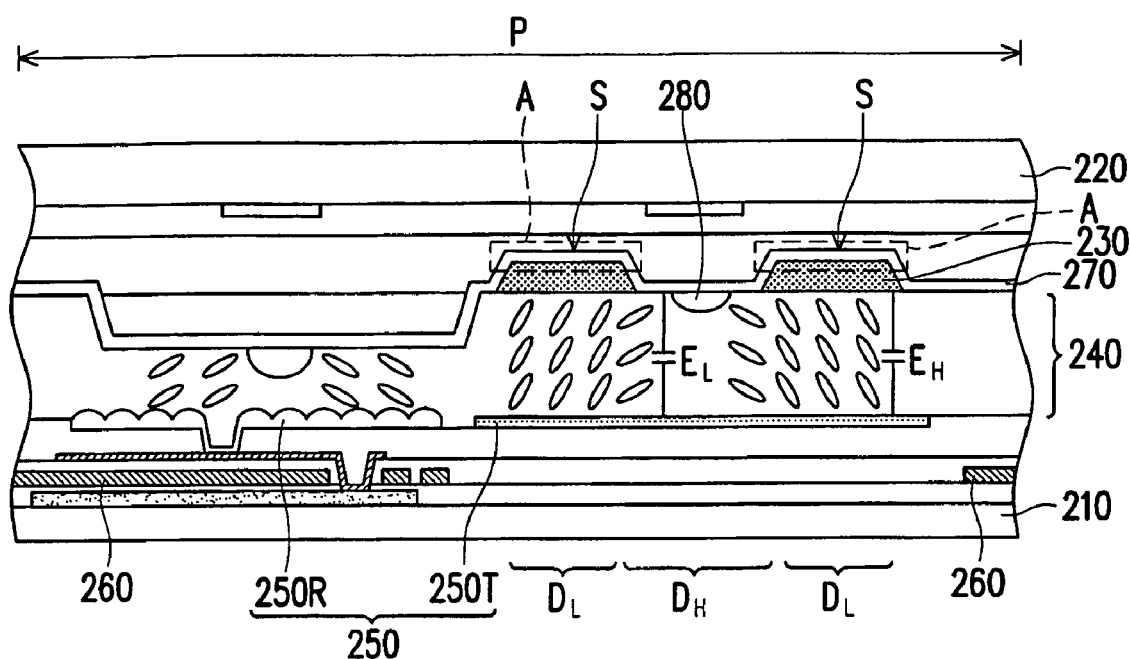
FIG. 2B is another cross-sectional view of the transflective multi-domain LCD in FIG. 2, taken along line A-A'.

FIG. 2B is another cross-sectional view of the multi-domain LCD in FIG. 2, taken along line A-A'. Referring to FIG. 2B, in the present embodiment, the electric field shielding layer 230 is formed on a part of the common electrode 270 of the opposite substrate 220. The fabrication process of the electric field shielding layer 230 may include following steps. First, a concave region S is formed on the opposite substrate 220, and then the common electrode 270 is formed on the opposite substrate 220. Accordingly, the common electrode 270 having a concave region A is formed in the concave region S of each pixel P. Next, the electric field shielding layer 230 is filled into the concave region A of the common electrode 270. Similarly, as shown in FIG. 2B, the liquid crystal layer 240 correspondingly to each pixel P is divided into a low-voltage domain $D_L$ corresponding to the electric field shielding layer 230 and a high-voltage domain $D_H$, and the liquid crystal layer 240 corresponding to the low-voltage domain $D_L$ and the liquid crystal layer 240 corresponding to the high-voltage domain $D_H$ have the same cell gap. When the electric field shielding layer 230 is disposed on a part of the common electrode 270 of the opposite substrate 220, the high-voltage domain $D_H$ is disposed around the low-voltage domain $D_L$ and the orientation of liquid crystal molecules has high stability.

It should be noted that the size and shape of the electric field shielding layer 230 corresponding to each pixel P may also be adjusted appropriately according to the actual design requirement, so that the dispositions and area ratio between the low-voltage domain $D_L$ and the high-voltage domain $D_H$ of each pixel P can be well controlled and color shift of the multi-domain LCD can be adjusted flexibly. Specifically, in the liquid crystal layer corresponding to each pixel, the low-voltage domain $D_L$ is disposed around the the high-voltage domain $D_H$. The performance in color shift reduction of the multi-domain LCD 200 with different area ratio between the low-voltage domain $D_L$ and the high-voltage domain $D_H$ having foregoing orientation will be described below.

Figure 2C:
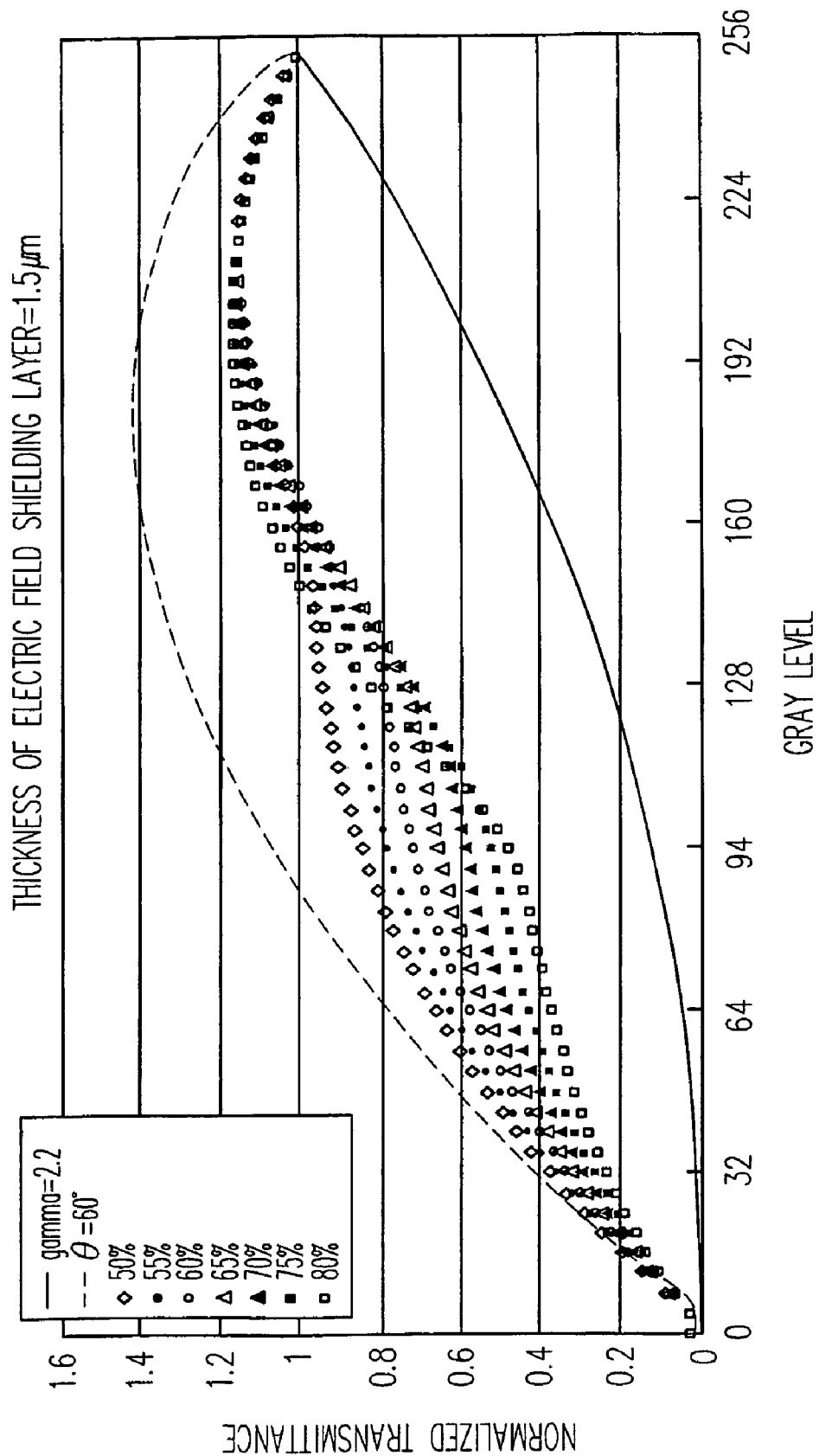
FIG. 2C and FIG. 2D respectively illustrate the relationship between the normalized transmittance and the gray level of a multi-domain LCD with different thickness of the electric field shielding layer.
Figure 2D:
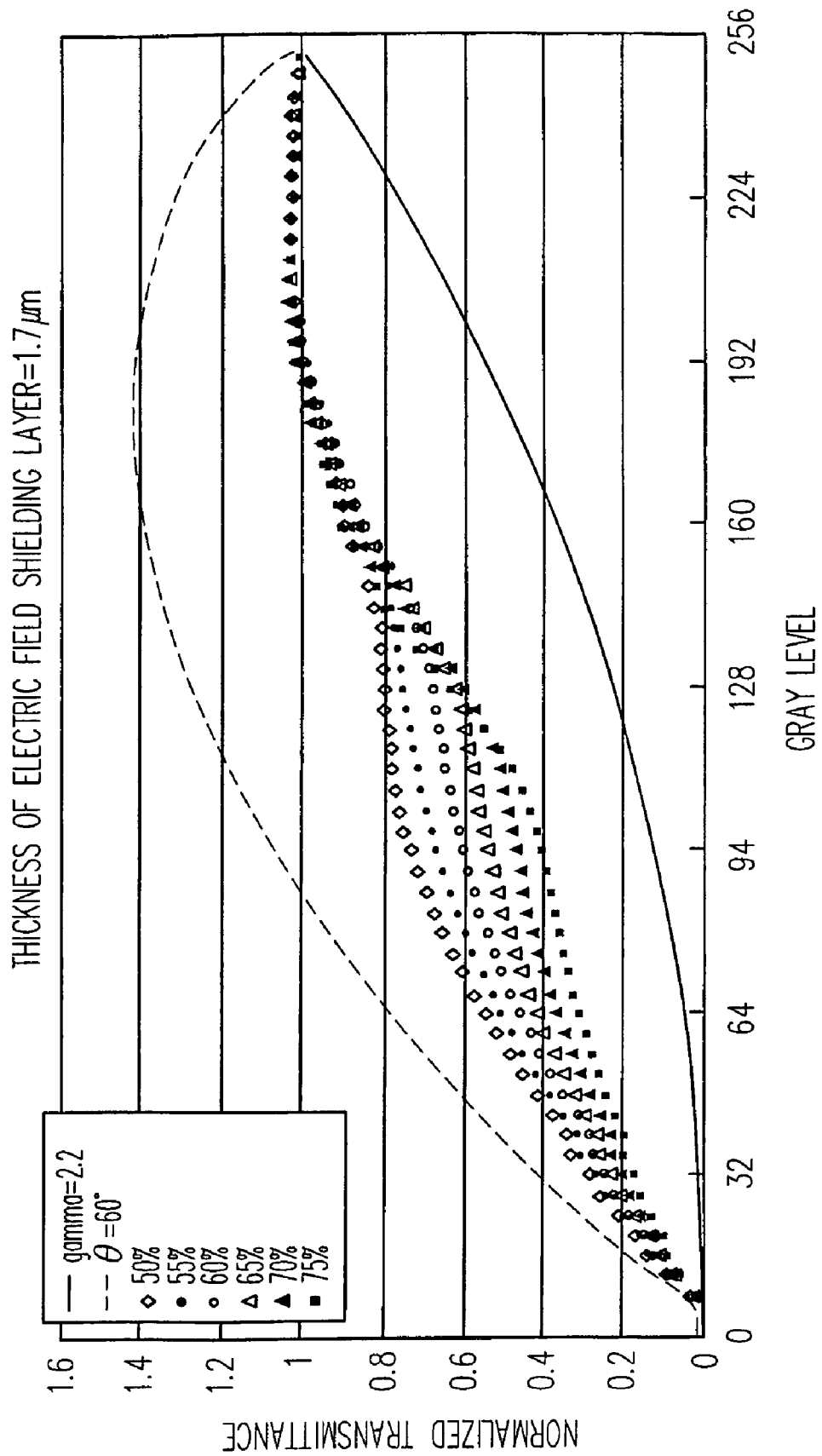

FIG. 2C and FIG. 2D respectively illustrate the relationship between the normalized transmittance and the gray level of a multi-domain LCD with different thickness of the electric field shielding layer, wherein the thickness of the electric field shielding layer 230 is respectively 1.5 µm and 1.7 µm, and the oblique viewing angle is 60°, for example. In this simulation, the area ratio between the high-voltage domain and the low-voltage domain of each pixel P is changed at an oblique viewing angle 60°, and along with the increase of the size of the low-voltage domain $D_L$ in each pixel P, even though the transmittance of the multi-domain LCD 200 is slightly reduced, the color shift thereof is greatly reduced. Accordingly, color shift of the multi-domain LCD 200 can be greatly improved.

Second Embodiment

Figure 3:
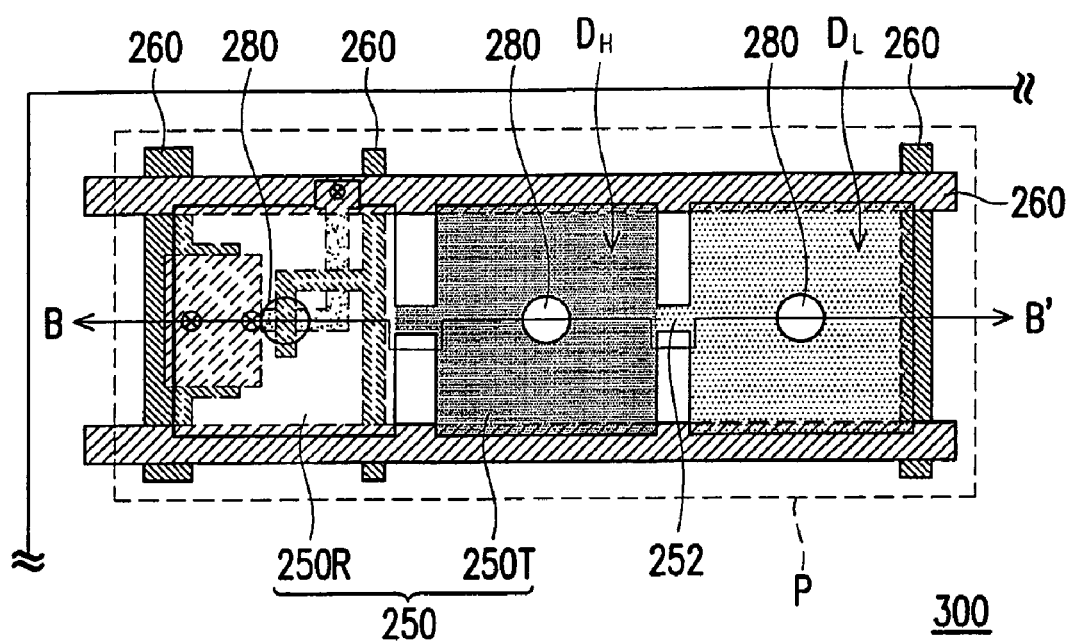
FIG. 3 is a diagram of a transflective multi-domain LCD according to a second embodiment of the present invention.

FIG. 3 is a diagram of a transflective multi-domain LCD according to the second embodiment of the present invention. In the present embodiment, the multi-domain LCD 300 is similar to the multi-domain LCD 200 in the first embodiment except that in the liquid crystal layer 240 corresponding to each pixel P, the dispositions of the low-voltage domain $D_L$ and the high-voltage domain $D_H$ are different. The transmissive electrode 250T is divided into a low-voltage domain $D_L$ and a high-voltage domain $D_H$. These two regions are separated by a main slit and are electrically connected by a connecting electrode 252 of the transmissive electrode 250T. As shown in FIG. 3, the low-voltage domain $D_L$ and the high-voltage domain $D_H$ are aligned with each other in the direction of columns, and the low-voltage domain $D_L$ is located at right side of the high-voltage domain $D_H$. However, in another embodiment of the present invention, the low-voltage domain $D_L$ may also be disposed at another side of the high-voltage domain $D_H$. The relative position of the low-voltage domain $D_L$ and the high-voltage domain $D_H$ is not limited.

Figure 3A:
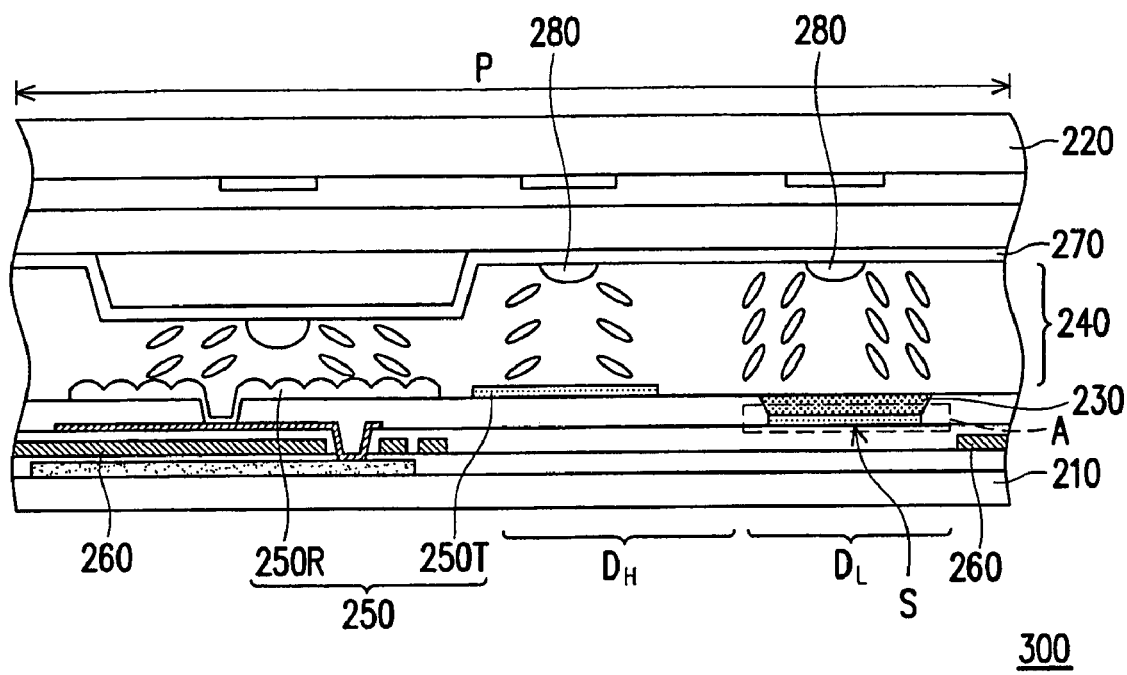
FIG. 3A is a cross-sectional view of the transflective multi-domain LCD in FIG. 3, taken along line B-B'.
Figure 3B:
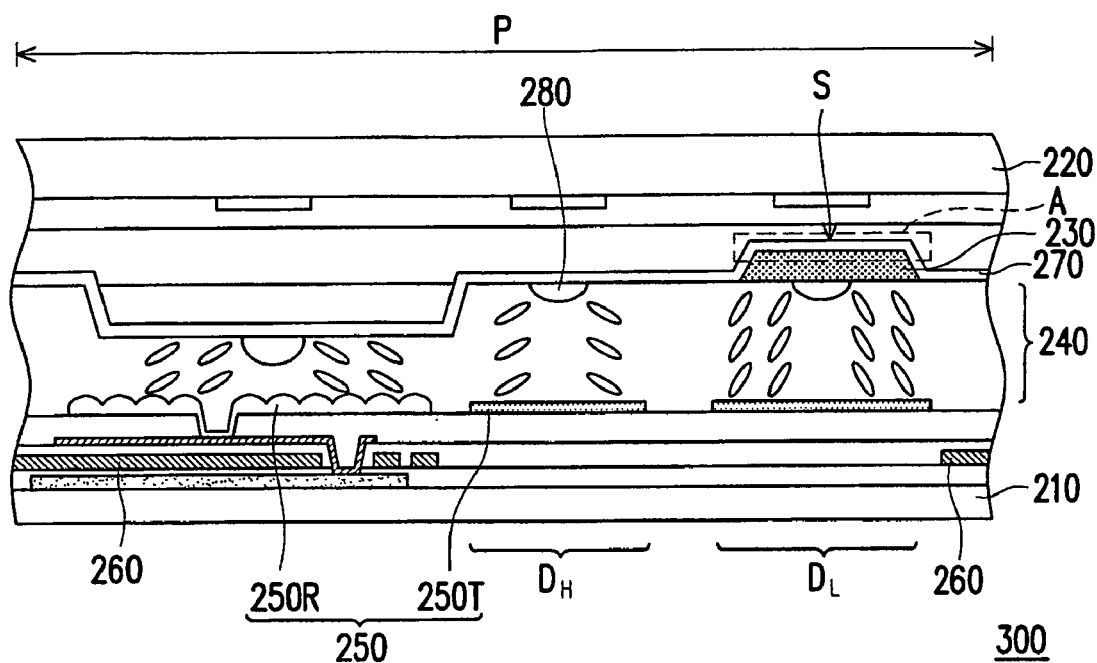
FIG. 3B is another cross-sectional view of the transflective multi-domain LCD in FIG. 3, taken along line B-B'.

FIG. 3A is a cross-sectional view of the transflective multi-domain LCD in FIG. 3, taken along line B-B'. Referring to FIG. 3A, the present embodiment is similar to the first embodiment, wherein the electric field shielding layer 230 may be disposed on each transmissive electrode 250T. FIG. 3B is another cross-sectional view of the transflective multi-domain LCD in FIG. 3, taken along line B-B'. As shown in FIG. 3B, the electric field shielding layer 230 may also be disposed on the common electrode 270.

Third Embodiment

In the first and the second embodiment described above, the multi-domain LCDs 200 and 300 are MVA-LCDs. However, the multi-domain LCD in the present invention is not limited to MVA-LCD, and which may also be a polymer stabilized alignment (PSA) LCD. Specifically, in a PSA-LCD, a polymer is added into the liquid crystal and transmissive electrodes having patterned slits are adopted, so that the liquid crystal molecules tilt toward the slits. Additionally, when the polymer is exposed to ultraviolet (UV), the polymer forms an alignment layer on the surface of the transmissive electrodes so that liquid crystal can be aligned automatically.

Figure 4:
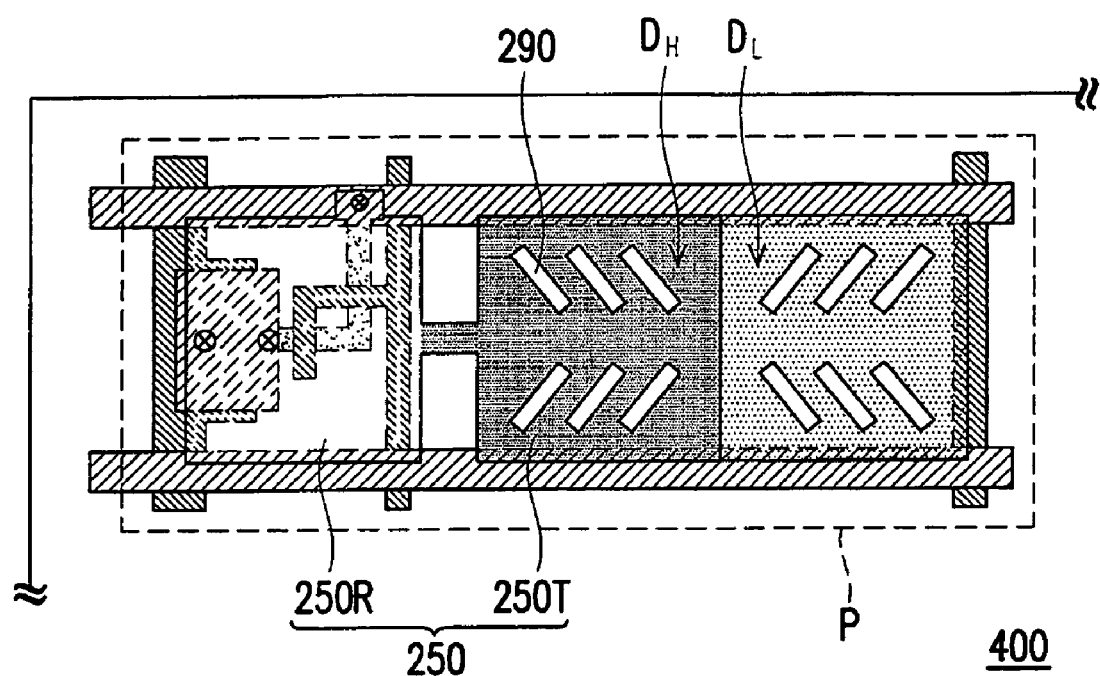
FIG. 4 is a diagram of a transflective multi-domain LCD according to a third embodiment of the present invention.

FIG. 4 is a diagram of a transflective multi-domain LCD according to the third embodiment of the present invention. The multi-domain LCD 400 in the present embodiment is similar to the multi-domain LCD 200 in the first embodiment except that the transmissive electrode 250T in each pixel electrode 250 of the multi-domain LCD 400 has a plurality of slits 290. However, each pixel electrode 250 may also be a transmissive electrode 250T without slits.

Figure 5:
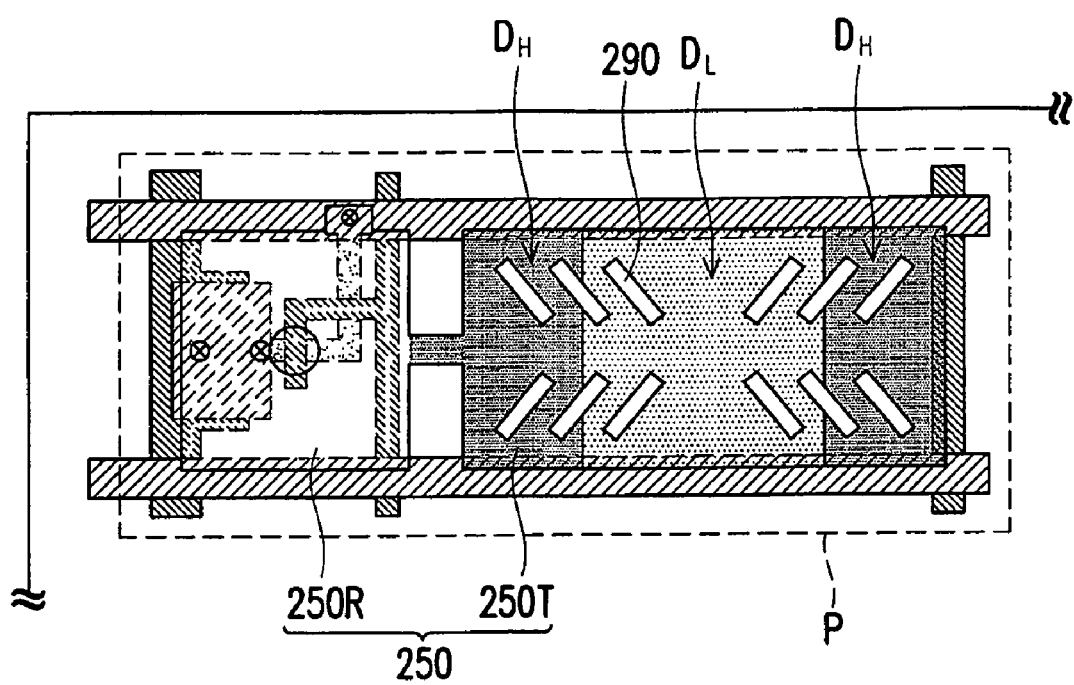
FIG. 5 is a diagram of a transflective multi-domain LCD according to an embodiment of the present invention.

Referring to FIG. 4, in the liquid crystal layer 240 corresponding to each pixel P, the low-voltage domain $D_L$ and the high-voltage domain $D_H$ are aligned with each other in the direction of columns. However in the liquid crystal layer 240 corresponding to each pixel P, the high-voltage domain $D_H$ may also be disposed at both sides of the low-voltage domain $D_L$, as shown in FIG. 5, or the low-voltage domain $D_L$ may be disposed at both sides of the high-voltage domain $D_H$. In addition, in the multi-domain LCD 400, the disposition, shape, size, and the area ratio in each pixel P of the electric field shielding layer 230 are similar to those in foregoing embodiment therefore will not be described herein.

It should be mentioned that the multi-domain LCDs 200, 300, and 400 in foregoing embodiments can be interpreted as a transflective LCD, but the LCD in the present invention is not limited thereto. In the present invention, an electric field shielding layer 230 is disposed in the multi-domain LCD so that the corresponding liquid crystal layer 240 can have electric fields of different intensities and accordingly color shift of the multi-domain can be improved. The present invention may also be applied to a transmissive LCD, which will be described below.

Fourth Embodiment

Figure 6:
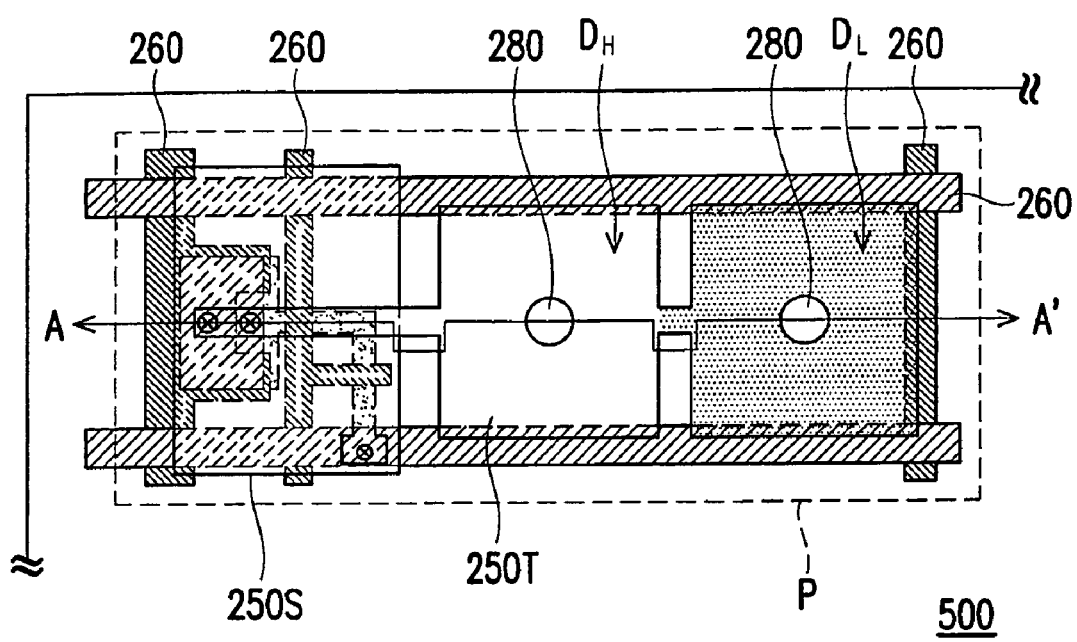
FIG. 6 is a top view of a transmissive multi-domain LCD according to a fourth embodiment of the present invention.

FIG. 6 is a top view of a transmissive multi-domain LCD according to the fourth embodiment of the present invention. As shown in FIG. 6, in the multi-domain LCD 500 of the present embodiment, the disposition of the transmissive electrode 250T is similar to that in the multi-domain LCD 300 explained in the second embodiment. The difference between the multi-domain LCD 500 and the multi-domain LCD 300 is that in each pixel P of the multi-domain LCD 500, a light-shielding domain 250S is disposed for replacing the reflective electrode 250R in the second embodiment, and a plurality of signal lines 260 for inputting display signals is disposed in the light-shielding domain 250S. As shown in FIG. 6, similar to the transmissive electrode 250T in the multi-domain LCD 300 of the second embodiment, the transmissive electrode 250T in the present embodiment can be divided into a low-voltage domain $D_L$ and a high-voltage domain $D_H$, and the low-voltage domain $D_L$ and the high-voltage domain $D_H$ are aligned with each other in the direction of columns. Besides, the fabrication process, shapes, and sizes of the low-voltage domain $D_L$ and the high-voltage domain $D_H$ are similar to those in foregoing embodiments therefore will not be described herein.

Figure 6A:
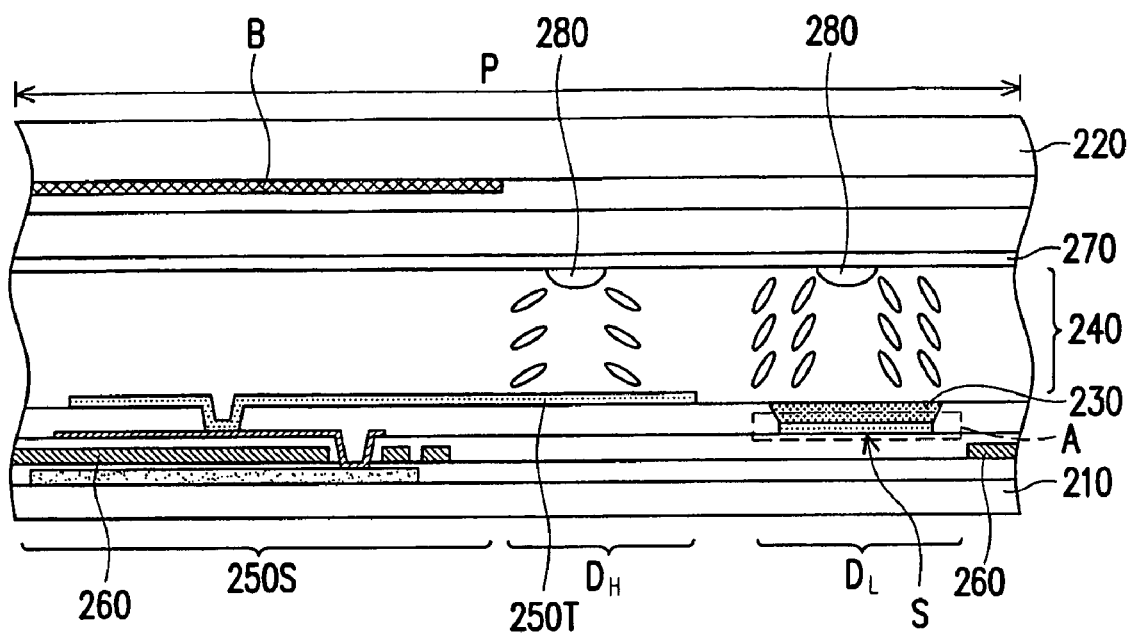
FIG. 6A is a cross-sectional view of the transmissive multi-domain LCD in FIG. 6, taken along line A-A'.
Figure 6B:
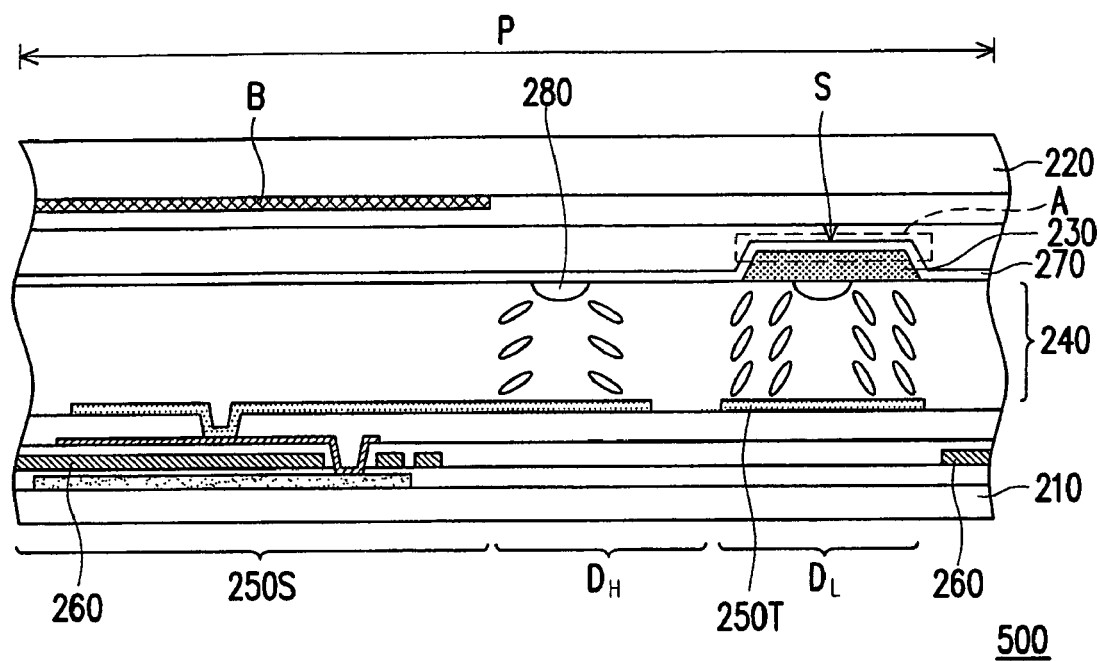
FIG. 6B is another cross-sectional view of the transmissive multi-domain LCD in FIG. 6, taken along line A-A'.

FIG. 6A is a cross-sectional view of the transmissive multi-domain LCD in FIG. 6, taken along line A-A'. Referring to FIG. 6A, the transmissive multi-domain LCD 300 in the present embodiment is similar to the multi-domain LCD 300 in the second embodiment, wherein the electric field shielding layer 230 may be disposed on each transmissive electrode 250T. Certainly, the electric field shielding layer 230 may also be disposed on the common electrode 270, as shown in FIG. 6B. In the present embodiment, the light-shielding domain 250S of each pixel P may be formed by disposing a black matrix B on the opposite substrate 220, wherein the black matrix B is used for shielding abnormal light produced by abnormal tilt of the liquid crystal layer above the corresponding signal line 260. Besides, the position, shape, size, and area ratio in the pixel P of the electric field shielding layer 230 in the transmissive multi-domain LCD are similar to those in foregoing embodiment therefore will not be described herein.

Fifth Embodiment

Figure 7:
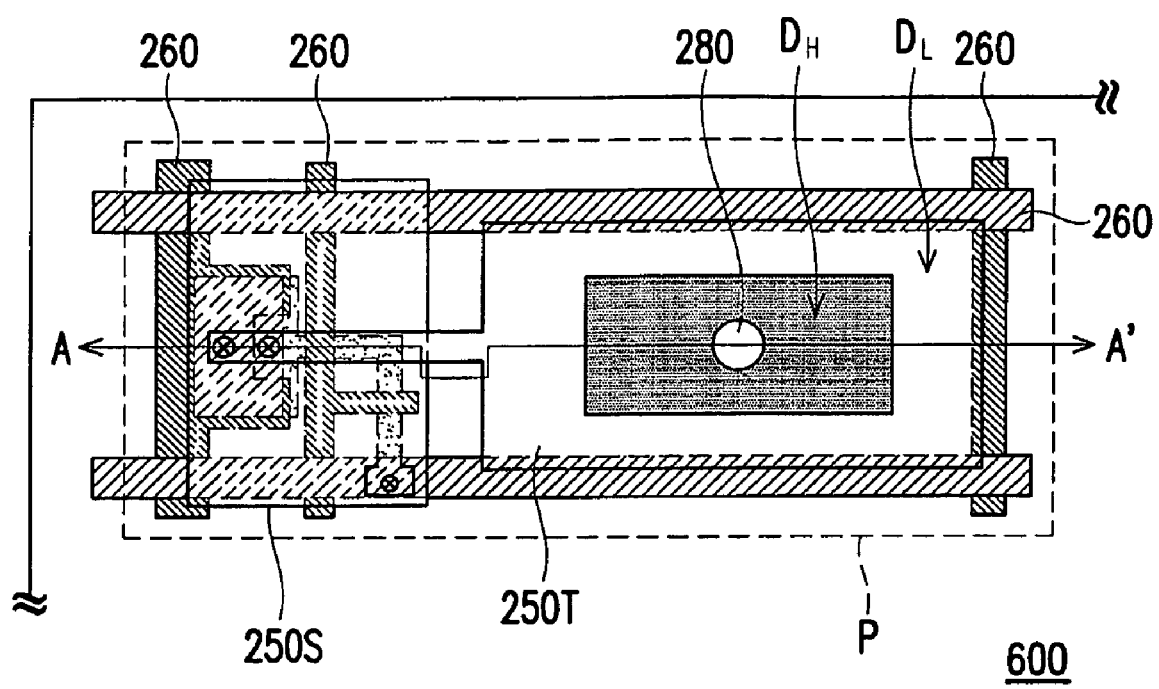
FIG. 7 is a top view of a transmissive multi-domain LCD according to a fifth embodiment of the present invention.

FIG. 7 is a top view of a transmissive multi-domain LCD according to the fifth embodiment of the present invention. Referring to FIG. 7, the multi-domain LCD 600 in the present embodiment is similar to the multi-domain LCD 500 in the fourth embodiment, and the difference between the two is in the dispositions of the low-voltage domain $D_L$ and the high-voltage domain $D_H$ corresponding to each pixel P. In the present embodiment, in the liquid crystal layer 240 corresponding to each pixel P, the low-voltage domain $D_L$ is disposed around the high-voltage domain $D_H$.

Figure 7A:
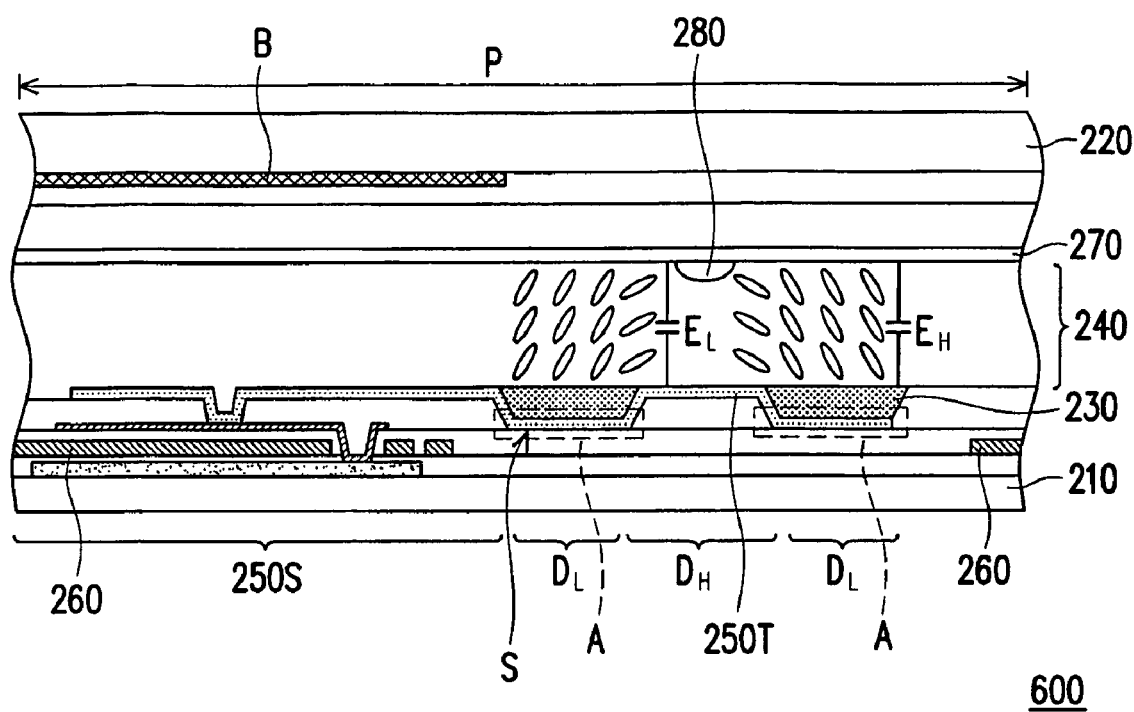
FIG. 7A is a cross-sectional view of the transmissive multi-domain LCD in FIG. 7, taken along line A-A'.
Figure 7B:
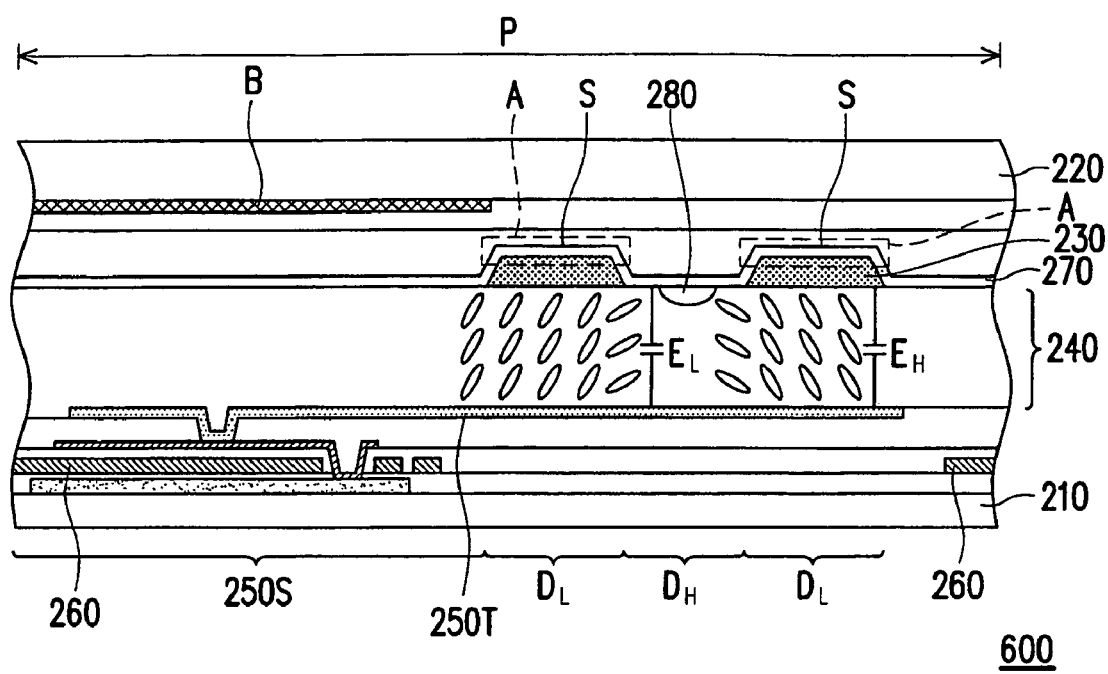
FIG. 7B is another cross-sectional view of the transmissive multi-domain LCD in FIG. 7, taken along line A-A'.

FIG. 7A is a cross-sectional view of the transmissive multi-domain LCD in FIG. 7, taken along line A-A'. Referring to FIG. 7A, the present embodiment is similar to foregoing embodiments, wherein the electric field shielding layer 230 may be disposed on each transmissive pixel electrode 250T. However, the electric field shielding layer 230 may also be disposed on the common electrode 270, as shown in FIG. 7B.

Figure 8:
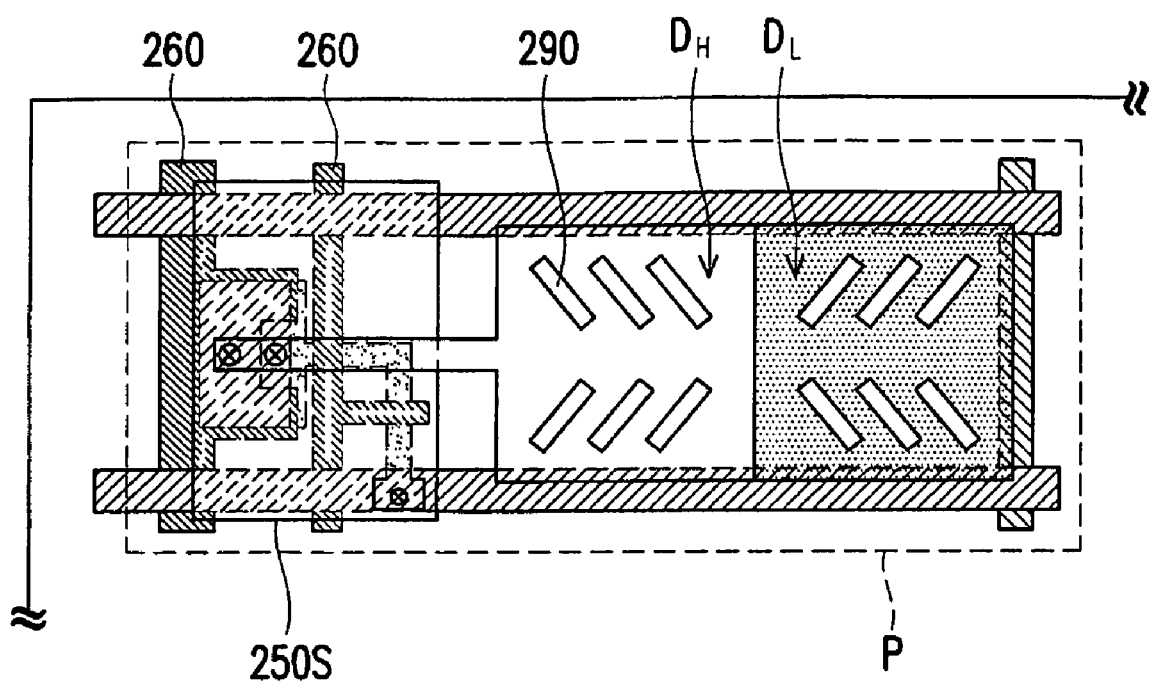
FIG. 8 is a diagram of a transmissive multi-domain LCD according to an embodiment of the present invention.
Figure 9:
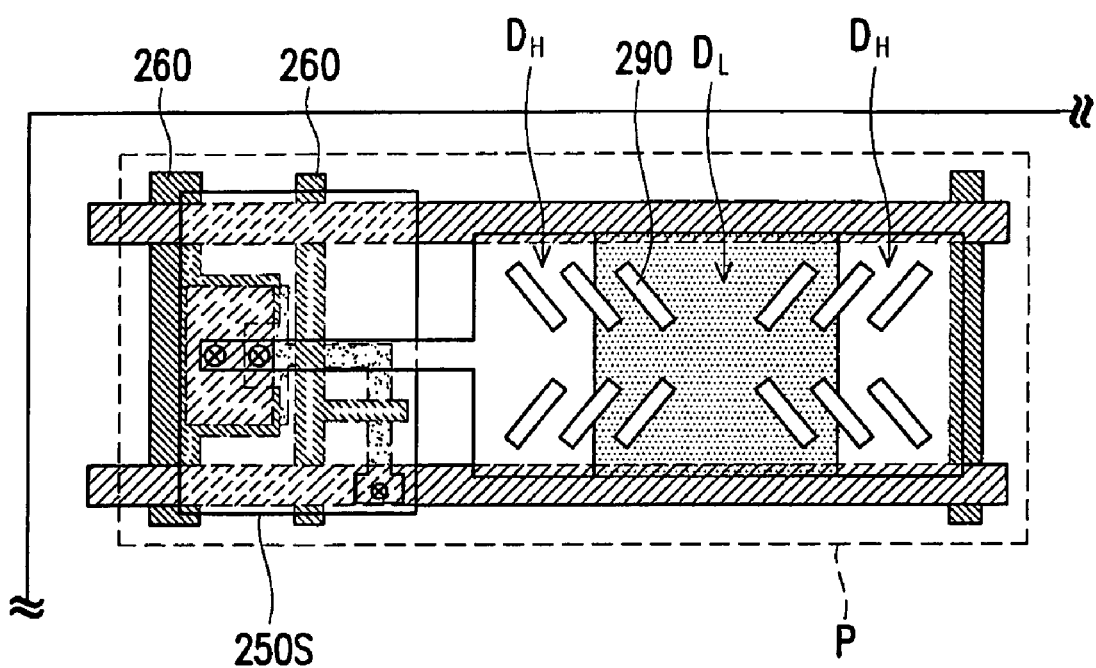
FIG. 9 is a diagram of a transmissive multi-domain LCD according to an embodiment of the present invention.

It should be noted that the shape of the transmissive electrode 250T and the shapes, sizes, relative position of the low-voltage domain $D_L$ and the high-voltage domain $D_H$ corresponding to the transmissive electrode 250T can be adjusted according to the actual design requirement and the application of the transmissive multi-domain LCD. To be specific, the application of the present invention in transmissive multi-domain LCD is similar to that in foregoing transflective multi-domain LCD, namely, the present invention may also be applied to MVA-LCD, patterned vertical alignment LCD, transmissive PSA-LCD, or other types of LCDS. FIG. 8 is a diagram of a PSA-LCD according to an embodiment of the present invention. As shown in FIG. 8, in the liquid crystal layer 240 corresponding to each pixel P, the low-voltage domain $D_L$ and the high-voltage domain $D_H$ are aligned with each other in the direction of columns. FIG. 9 is a diagram of another PSA-LCD according to an embodiment of the present invention. As shown in FIG. 9, in the liquid crystal layer 240 corresponding to each pixel P, the high-voltage domain $D_H$ is disposed at both sides of the low-voltage domain $D_L$. The high-voltage domain $D_H$ and the low-voltage domain $D_L$ may also have other disposition relations, and the shapes, sizes, and relative position of the high-voltage domain $D_H$ and the low-voltage domain $D_L$ corresponding to the transmissive electrode 250T are not limited. As described above, in the present invention, the liquid crystal layer corresponding to each pixel in a multi-domain LCD is divided into a low-voltage domain and a high-voltage domain having the same cell gap by an electric field shielding layer, so that the liquid crystal layer above each pixel can tilt to different directions and accordingly color shift of the multi-domain LCD is improved. The multi-domain LCD provided by the present invention offers high flexibility in color shift adjustment. In addition, in the present invention, color shift of the multi-domain LCD is improved without changing the design of capacitor or transistor in each pixel unit, therefore compared to the conventional techniques, a higher aperture ratio of the multi-domain LCD is maintained.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A multi-domain liquid crystal display (LCD), comprising:
    an active device array substrate having a plurality of pixels, wherein each of the pixels has a pixel electrode;
    an opposite substrate having a common electrode disposed between the opposite substrate and the active device array substrate;
    a liquid crystal layer disposed between the active device array substrate and the opposite substrate, wherein the liquid crystal layer corresponding to each of the pixels is divided into a low-voltage domain and a high-voltage domain; and
    an electric field shielding layer adjacent to the liquid crystal layer, wherein the position of the electric field shielding layer is corresponding to the position of the low-voltage domain of the liquid crystal layer.

2. The multi-domain LCD according to claim 1, wherein the low-voltage domain and the high-voltage domain have the same cell gap.

3. The multi-domain LCD according to claim 1, wherein the electric field shielding layer is disposed on a part of each of the pixel electrodes.

4. The multi-domain LCD according to claim 3, wherein each of the pixel electrodes has a concave region and the electric field shielding layer is located the concave regions.

5. The multi-domain LCD according to claim 3, wherein in the liquid crystal layer corresponding to each pixel, the high-voltage domain is located at both sides of the low-voltage domain.

6. The multi-domain LCD according to claim 1, wherein the electric field shielding layer is disposed on a part of the common electrode.

7. The multi-domain LCD according to claim 6, wherein in the liquid crystal layer corresponding to each pixel, the high-voltage domain is located at both sides of the low-voltage domain.

8. The multi-domain LCD according to claim 6, wherein the common electrode has a concave region, and the electric field shielding layer is located in the concave region.

9. The multi-domain LCD according to claim 1, wherein each of the pixel electrodes comprises a transmissive electrode.

10. The multi-domain LCD according to claim 1, wherein each of the pixel electrodes comprises a reflective electrode connected to the transmissive electrode.

11. The multi-domain LCD according to claim 1, wherein the active device array substrate further comprises a plurality of signal lines electrically connected to the corresponding pixels.

12. The multi-domain LCD according to claim 1 further comprising a plurality of alignment protrusions disposed on the common electrode of the opposite substrate.

13. The multi-domain LCD according to claim 1, wherein each of the pixel electrodes of the active device array substrate has a plurality of slits.

14. The multi-domain LCD according to claim 1, wherein in the liquid crystal layer corresponding to each pixel, the low-voltage domain is located around the high-voltage domain.

15. The multi-domain LCD according to claim 1, wherein a thickness of the electric field shielding layer is greater than or equal to 1.0 µm.

16. The multi-domain LCD according to claim 1, wherein a material of the electric field shielding layer comprises a dielectric material.

17. The multi-domain LCD according to claim 1, wherein a material of the electric field shielding layer comprises an organic material.

18. The multi-domain LCD according to claim 1, wherein in the liquid crystal layer corresponding to each pixel, the low-voltage domain and the high-voltage domain are aligned with each other in the direction of columns.

19. The multi-domain LCD according to claim 1, wherein in the liquid crystal layer corresponding to each pixel, the high-voltage domain is located at both sides of the low-voltage domain.

* * * * *